Patented Jan. 19, 1932

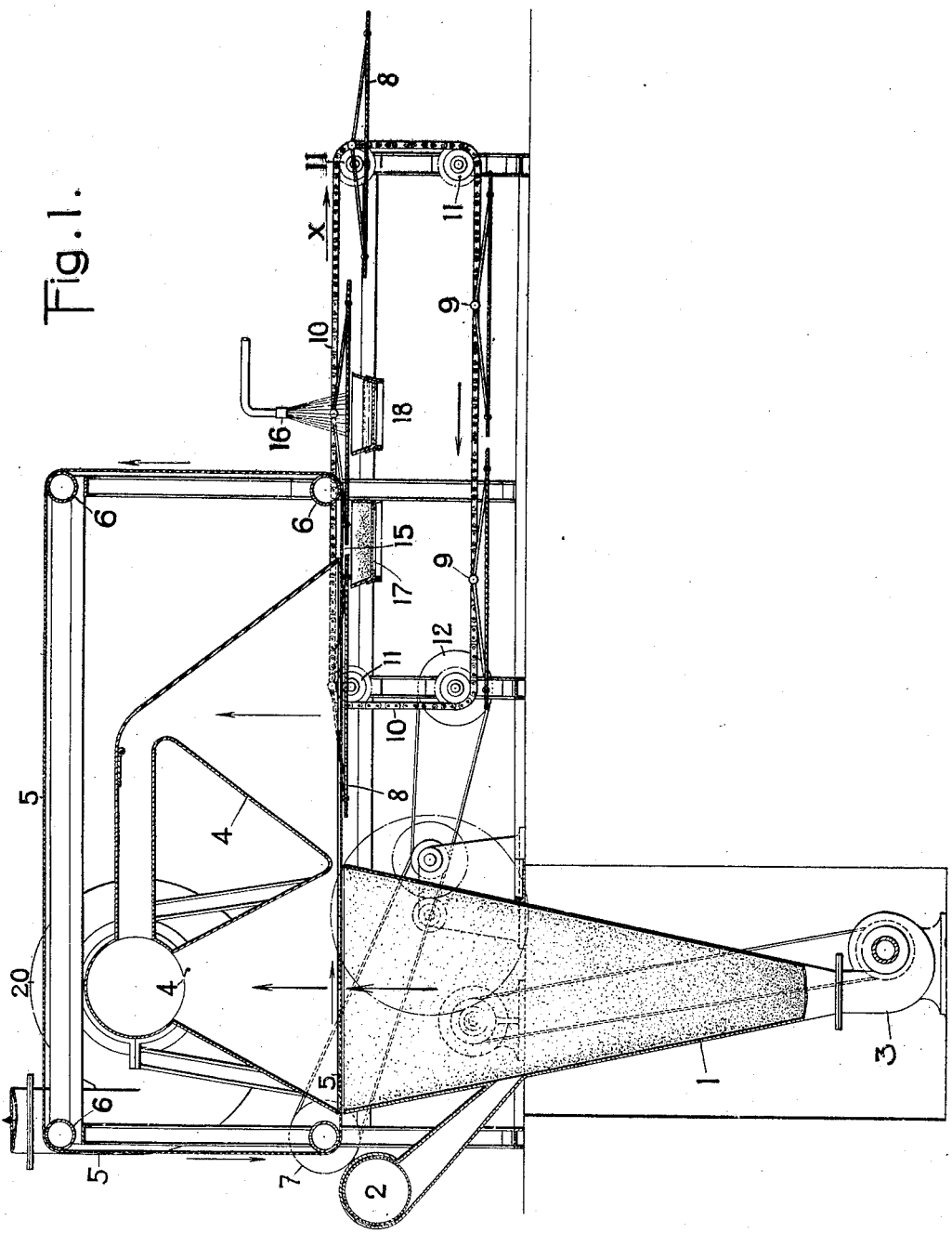

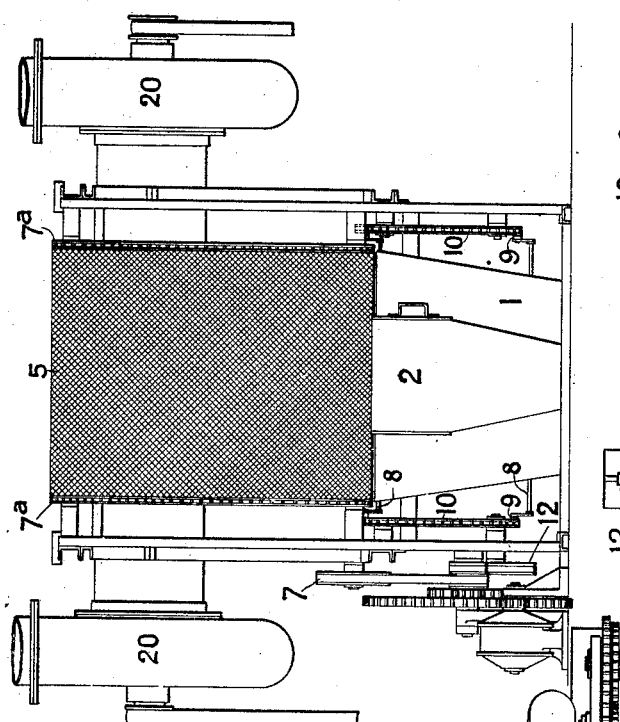
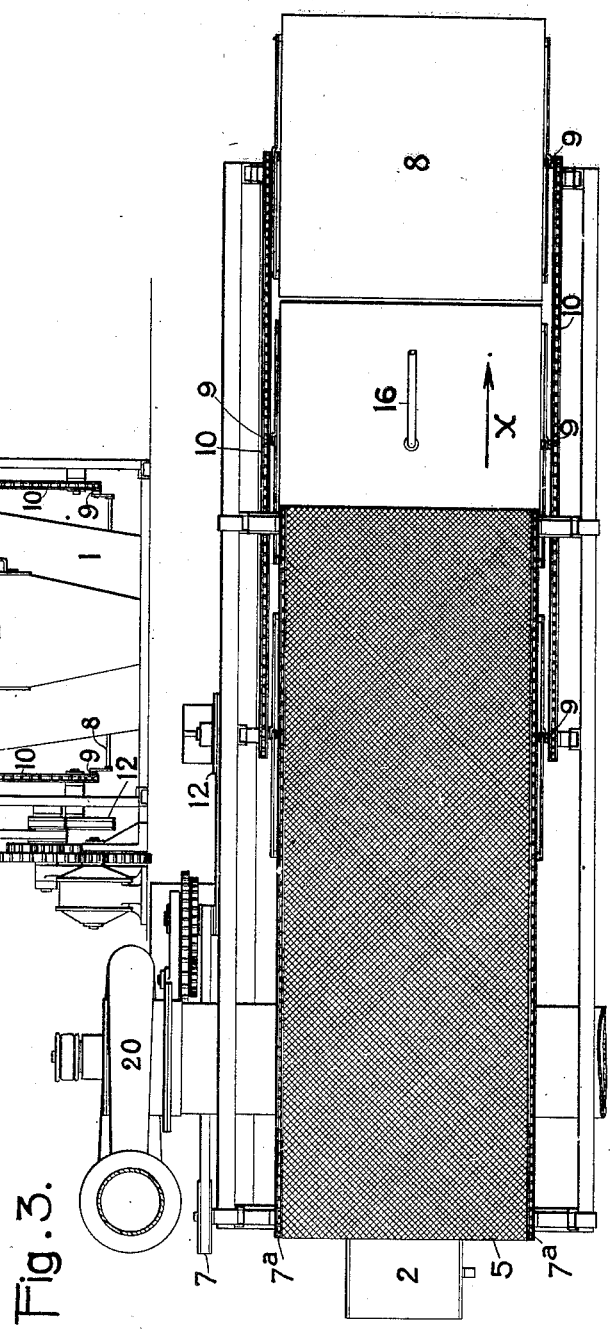

1,842,008

UNITED STATES PATENT OFFICE

JOSEF BORER, OF BREITENBACH, NEAR BASEL, SWITZERLAND

APPARATUS FOR THE MANUFACTURE OF MICA SHEETS

Application filed May 20, 1929. Serial No. 364,640.

The invention relates to apparatus for manufacturing mica sheets for electrically insulating purposes by means of mica flakes which are carried by suction against a movable conveyer surface and conveyed thereby to the place of delivery. The invention consists in that a sieve forming the conveyor surface is guided in a horizontal path above horizontal former plates carried by endless running members, these plates reaching the sieve, which is covered with mica flakes, one after the other in a horizontal position and proceeding together with the sieve so as to receive the mica flakes in a thin layer at a place where the suction is interrupted and where the mica flakes are thus released to fall down from the sieve upon the cooperating former plate, and to carry this layer of flakes to a place where adhesive is applied, the passage of such former plates through the apparatus being repeated one or more times if necessary in order to obtain sheets of the desired thickness.

The drawings illustrate an example of apparatus according to the invention;

Figure 1 is a vertical cross-section,
Figure 2 is a partial frontal view and
Figure 3 is a plan view thereof.

A shaft or trunk 1, which is fed with mica flakes or thin leaves of mica from 2 and is connected in known manner at the bottom with a fan blower 3, in order to keep the mica flakes continually in suspension, has arranged above its upper end a suction chamber 4 which is open at the bottom and is there traversed by a flexible sieve 5 serving as a conveyer surface. The sieve 5 runs over rollers 6 and is continuously moved in a circuit by a pulley drive 7 and a chain drive 7ª connected thereto in such a way that it runs horizontally over the upper opening of the shaft 1 and tightly under the suction chamber 4. In this way the underside of this horizontal part of the sieve 5 is covered with mica flakes which are sucked on to the sieve by the suction in the chamber 4. The mica layer so formed passes along with the sieve 5 in the direction of the arrow $x$ and passes immediately above one of a series of former plates 8 at a place where the suction of the chamber 4 is still operative, the former plate proceeding with the sieve and the layer of mica adhering thereto. The former plates 8 are each supported at their longitudinal sides on two pins 9 projecting from two parallel running endless chains 10 which run over chain sprockets 11 mounted on side members of the frame of the apparatus and are actuated by driving means 12.

The former plates 8 hang between and below the chains 10 so that they do not interfere with the chains when they alter their direction of movement. They may conveniently be covered with a support sheet and serve to receive the layer of mica adhering to the sieve 5 when the suction thereon is released. This occurs at the place 15 in the path of the sieve 5 where the latter passes beyond the bottom of the suction chamber 4, thus releasing the suction from the layer of mica adhering to the sieve 5. The mica therefore is released from the sieve 5 at this place and applies itself in a uniform layer on that former plate 8 which is ready there, which latter finally carries the mica layer upon it under a lacquer or adhesive spraying device 16 so that the layer is rendered cohesive and is prepared for the application, if desired, of a further mica layer. The same process takes place with each one of the former plates 8. The unused mica falling off the sieve 5 between the successive former plates 8 is collected in a trough 17 for using again. Similarly the superfluous lacquer is collected in a trough 18.

The former plates 8 can be fed in this way through the apparatus any desired number of times. Each time they are so fed through they receive a mica layer which adheres to the previous one. Naturally these mica layers are made so thin and the structural dimensions are so designed that the operation of the apparatus is not affected by the increase of thickness of the mica layers. When the mica sheets on the former plates have attained the desired thickness, which depends on the number of times the former plates have passed through the apparatus, the finished mica sheets can be removed from the former plates 8 at the right hand end (Figure 1) of the apparatus and can be passed on for further treatment.

The suction in the chamber 4 is produced by two suction fans 20 (Figure 2) arranged one on each side, which owing to their acting at both sides of the chamber ensure a uniform distribution of the mica flakes on the underside of the sieve.

In a modification it may be advisable to provide, on the path of the former plates, after the adhesive spraying device, a pair of pressure rollers movable onto the former plate with the mica sheet thereon, the one from the upper side, the other from the lower side thereof, so as to exert a pressure on the mica sheet while the former plate is supported from below, the upper roller being advantageously spring yieldingly supported and heated by means of steam or the like.

Instead of the former plates, an endless supporting band or any other supporting members having a circulating movement for receiving the mica sheets and conveying them away can be employed.

What I claim is:

1. An apparatus for the manufacture of mica sheets, comprising in combination a movable apertured conveyer, a suction chamber arranged immediately above the latter, a device for feeding mica flakes to said conveyer so as to apply them thereon by suction from said chamber, and an endless series of former plates arranged to be fed successively to said conveyer and to proceed with it and the mica layer adhering thereto to a releasing place beyond the suction chamber to allow there delivery of the mica layer from the conveyer to the former plates.

2. An apparatus for the manufacture of mica sheets, comprising in combination a movable apertured conveyer, a suction chamber arranged immediately above the latter, a device for feeding mica flakes to said conveyer so as to apply them thereon by suction from said chamber, an endless series of former plates arranged to be fed successively to said conveyer and to proceed with it and the mica layer adhering thereto to a releasing place beyond the suction chamber to allow there delivery of the mica layer from the conveyer to the former plates, and an adhesive spraying device above the former plates beyond said releasing place for the purpose of binding the mica layers thereon.

3. An apparatus for the manufacture of mica sheets, comprising in combination a movable apertured conveyer, a suction chamber arranged immediately above the latter, a device for feeding mica flakes to said conveyer so as to apply them thereon by suction from said chamber, an endless series of former plates to receive the mica layer adhering to said conveyer, two movable endless chains for carrying said former plates so as to always have the plates in horizontal position and means for so guiding said chains with respect to said conveyer as to feed the former plates one by one to said conveyer and to cause them to proceed therewith and with the mica layer adhering thereto to a releasing place beyond the suction chamber to allow there delivery of the mica layer from the conveyer to the former plates.

In witness whereof I have hereunto signed my name this 6th day of May, 1929.

JOSEF BORER.